(12) United States Patent
Bruemmer (10) Patent No.: US 9,586,314 B2
(45) Date of Patent: Mar. 7, 2017

(54) GRAPHICAL RENDITION OF MULTI-MODAL DATA

(71) Applicant: 5D Robotics, Inc., Carlsbad, CA (US)

(72) Inventor: David J. Bruemmer, Carlsbad, CA (US)

(73) Assignee: 5D Robotics, Inc., Carlsbad, CA (US)

( * ) Notice: Subject to any disclaimer, the term of this patent is extended or adjusted under 35 U.S.C. 154(b) by 0 days.

(21) Appl. No.: 14/717,219

(22) Filed: May 20, 2015

(65) Prior Publication Data
US 2015/0269757 A1  Sep. 24, 2015

Related U.S. Application Data

(63) Continuation of application No. 13/598,021, filed on Aug. 29, 2012, now abandoned.

(60) Provisional application No. 61/529,206, filed on Aug. 30, 2011.

(51) Int. Cl.
| | |
|---|---|
| G06T 17/05 | (2011.01) |
| B25J 9/16 | (2006.01) |
| G06K 9/00 | (2006.01) |
| G06K 9/62 | (2006.01) |
| B25J 9/08 | (2006.01) |
| G06F 3/01 | (2006.01) |
| G06T 11/20 | (2006.01) |
| G01C 21/34 | (2006.01) |
| G08G 1/00 | (2006.01) |

(52) U.S. Cl.
CPC ............ *B25J 9/1602* (2013.01); *B25J 9/08* (2013.01); *B25J 9/161* (2013.01); *B25J 9/1633* (2013.01); *B25J 9/1666* (2013.01); *B25J 9/1684* (2013.01); *B25J 9/1694* (2013.01); *B25J 9/1697* (2013.01); *G01C 21/34* (2013.01); *G06F 3/016* (2013.01); *G06K 9/00791* (2013.01); *G06K 9/6293* (2013.01); *G06T 11/206* (2013.01); *G08G 1/22* (2013.01); *Y10S 901/09* (2013.01); *Y10S 901/10* (2013.01)

(58) Field of Classification Search
USPC ................................ 345/418, 419, 440, 441
See application file for complete search history.

(56) References Cited

U.S. PATENT DOCUMENTS

| | | | | |
|---|---|---|---|---|
| 7,778,632 | B2 * | 8/2010 | Kurlander | H04M 1/72566 348/61 |
| 9,053,222 | B2 * | 6/2015 | Lynn | G06F 19/321 |
| 2007/0112714 | A1 * | 5/2007 | Fairweather | G06F 8/427 706/46 |
| 2009/0307772 | A1 * | 12/2009 | Markham | H04L 41/142 726/22 |

(Continued)

*Primary Examiner* — Kimbinh T Nguyen
(74) *Attorney, Agent, or Firm* — Martensen IP (57) ABSTRACT

Changes and anomalies in multi-modal data are detected, collected and abstracted into understandable and actionable formats utilizing, for example, color, intensity, icons and texture creating a rendition of current and developing situations and events. Changes and anomalies in multi-modal sensor data are detected, aggregated, abstracted and filtered using case-based reasoning providing a tractable data dimensionality. From this collection of data situations are recognized and presented in a means so as to assist a user in accessing an environment and formulate the basis a recommended course of action.

27 Claims, 3 Drawing Sheets

(56) References Cited

U.S. PATENT DOCUMENTS

2010/0305806 A1* 12/2010 Hawley .................. G07C 5/008
                        701/31.4
2012/0287749 A1* 11/2012 Kutlik .................... G01H 3/125
                         367/7

* cited by examiner

GRAPHICAL RENDITION OF MULTI-MODAL DATA

RELATED APPLICATION

The present application is a continuation application of U.S. patent application Ser. No. 13/598,021 filed Aug. 29, 2012 which claims the benefit of priority to U.S. Provisional Patent Application No. 61/529,206 filed Aug. 30, 2011 both of which are hereby incorporated by reference in their entirety for all purposes as if fully set forth herein. The present application is further related to the following commonly assigned patent applications: U.S. patent application Ser. No. 13/597,791 entitled, "Asynchronous Data Stream Framework", U.S. patent application entitled, "Vehicle Management System", U.S. patent application Ser. No. 13/597,991 entitled, "Modular Robotic Manipulation", and U.S. patent application Ser. No. 13/598,144 entitled, "Universal Payload Abstraction, all of which filed on Aug. 29, 2012.

BACKGROUND OF THE INVENTION

Field of the Invention

Embodiments of the present invention relate, in general, to graphical rendition of data and more particularly to systems and methods for providing interactive displays of multi-modal data.

Relevant Background

Sensor fusion involves a wide spectrum of interest. These interests range from sensor hardware and data acquisition to analog and digital processing of data to symbolic analysis and rendition. And in each instance fusion of data typically operates in a framework directed to resolve some class of problem.

Sensor fusion combines sensory data or data derived from sensory data from disparate sources such that, ideally, the result gained from the combined information is better than would be possible when these sources are used individually. The term better in this case can mean more accurate, more complete, or more dependable, or refers to the result of an emerging view, such as stereoscopic vision (calculation of depth information by combining two-dimensional images from two cameras at slightly different viewpoints).

The data sources for a fusion process are not specified to originate from identical sensors or from even "sensors" of a particular class. As would be known to one skilled in the art of sensor fusion, direct fusion is the fusion of sensor data from a set of heterogeneous or homogeneous sensors, soft sensors, and history values of sensor data, while indirect fusion uses information sources like a priori knowledge about the environment and human input.

Information integration, a concept closely related to sensor fusion, is the merging of information from disparate sources with differing conceptual, contextual and typographical representations. It is used in operations such as data mining and consolidation of data from unstructured or semi-structured resources. Typically, information integration refers to textual representations of knowledge but is sometimes applied to rich-media content. Information fusion, which is a related term involves the combination of information into a new set of data towards the goal of reducing uncertainty. An example of technologies available to integrate information include string metrics which allow the detection of similar text in different data sources by fuzzy matching.

Work on sensor fusion and information integration over the past two decades has attempted to fuse large amounts of disparate raw data into an information-rich, "system-of-systems" data display. The displays of the prior art is generally characterized by being dependent on GPS, possessing some for more of terrain data, and possess high bandwidth data communication. Unfortunately, recipients of such systems consistently report being overwhelmed with data, find it difficult to correlate the information spatially or temporally into actionable insights, or do not receive vital data of local relevance.

The continuous receipt and transmission of detailed raw data often requires high bandwidth communications systems and yet yields marginal returns. Such approach imposes a high workload on users or analysts to extract locally relevant insights across even a few modalities to geographically separated users. Moreover, current approaches to real-time information gathering and dissemination are not linked egocentrically to user movement and local changes. There remains a need to render multi-modal data in such a way as to highlight view point, motion and relative changes and to process that data so as to recognize events rather than objects or images. One or more features of the present invention address these and other deficiencies of the prior art.

SUMMARY OF THE INVENTION

Anomalies and/or changes of multi-modal data collected from a plurality of data source and/or sensors is abstracted, filtered and, in some cases, aggregated to form a coherent rendition of significant events. Embodiments of the present invention analyze multi-modal data to identify changes or anomalies that are representative of significant events in a particular context. Data that is seemingly unrelated can, when correlated, abstracted, contextually associated and aggregated, yield useful information regarding a particular situation and assist a user in making informed decisions and responses.

According to one embodiment of the present invention data collected from one or more modalities is analyzed to determine whether any anomalies or unexpected changes have occurred. For the purpose of this application a modality is understood to represent a particular mode in which something exists or is experienced or expressed; a particular method or procedure or a particular form of sensory perception; e.g., traditional modalities of representing time and space.

From these anomalies/changes a cross-correlated common frame of reference is created to produce a coherent rendition of the data across a plurality of modalities. This data is further subjected to an image recognition process by which patterns and events are discerned. These relevant events, along with the coherent data, are presented in a rendition that assists users to make informed decisions regarding an appropriate response. The present invention provides a common way to process data, looking for anomalies and changes in that data, and then iteratively reduce that data into intelligible patterns so as to be ultimately reduced to a representation of meaningful symbols that a user can interpret.

According to another embodiment of the present invention, a system for rendition of multi-modal data includes a data collection module operable to asynchronously collect static and/or dynamic data across a plurality of data modalities, an anomaly detection module operable to detect one or more anomalies for each of a plurality of data modalities against background/historical data, an anomaly correlation module operable to combine detected anomalies for each of the plurality of modalities into a common representation that is cross-correlated between each modality, and a rendition module operable to render cross-correlated and contextually associated common representations of detected anomalies.

Another aspect of the above referenced invention includes the ability to process the data collected asynchronously and in parallel among the data modalities.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein.

The Figures depict embodiments of the present invention for purposes of illustration only. One skilled in the art will readily recognize from the following discussion that alternative embodiments of the structures and methods illustrated herein may be employed without departing from the principles of the invention described herein.

DESCRIPTION OF THE INVENTION

Embodiments of the present invention are hereafter described in detail with reference to the accompanying Figures. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

One embodiment of the present invention comprises a system and method for providing an interactive display with live and/or historical, local information regarding changes and anomalies identified within a local environment. Using information gained the present invention, in another embodiment, suggests potential responses. Information relevant to such responses is gathered by a plurality of sensors. In one implementation of the present invention sensors can be placed at strategic locations including mounted on the members of a squad or attached to manned or unmanned vehicles as an input to data collection units (DCU). Information can also be provided to the system by individuals, maps, past photographs, historical data, etc.

In one version of the invention sensor data is initially processed locally by the DCU resulting in a data abstraction. These abstractions are sent to a higher level processor or data analysis unit (DAU) where data are aggregated, filtered, and analyzed. From this unit a rendition of the data is generated that is further analyzed and processed. This processing of data, indeed the entire approach in analyzing and rending the data, can take place in the field or by distant processors or both, and could be accomplished within one or more of the DCUs.

The resulting spectrum of data from the approach outlined above is predominately "live" and "local" but the invention further includes the ability to integrate information from distant observers or earlier findings about the area. These data points are crafted into easy to manage, user-configurable displays and integrated into the live/local data to allow users to visualize, comprehend, and react to events in space and time. One aspect of the present invention is its iterative methodology for making a stylized, abstracted picture out of copious, multi-modal data. Within the automated methodology of the present invention, a host of graphical effects are used to render data into symbolic entities with semantic meaning that is recognizable to both humans as well as to visual machine learning algorithms. Unlike raw data or even abstracted, filtered data of the prior art, the graphical symbols and rendition of the present invention provide unique means to find recognizable order within disorder.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Included in the description are flowcharts depicting examples of the methodology which may be used to render multi-modal data. In the following description, it will be understood that each block of the flowchart illustrations, and combinations of blocks in the flowchart illustrations, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve the manipulation of information elements. Typically, but not necessarily, such elements may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," "words", or the like. These specific words, however, are merely convenient labels and are to be associated with appropriate information elements.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for an interaction system for a distributed tangible user interface through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

One or more embodiments of the present invention abstracts and correlates data collected by a variety and plurality of disparate sensors or other data sources to identify and locate critical events. These events are thereafter present them within a simple, multifaceted display. In addition the present invention can identify potential hazards and/or opportunities and then suggest possible responses to the situation based on the context in which the data was collected and analyzed. Secondarily, the invention is novel in its ability to simultaneous use such a wide range of types and sources of data to identify and characterize the situation.

Figure 1:
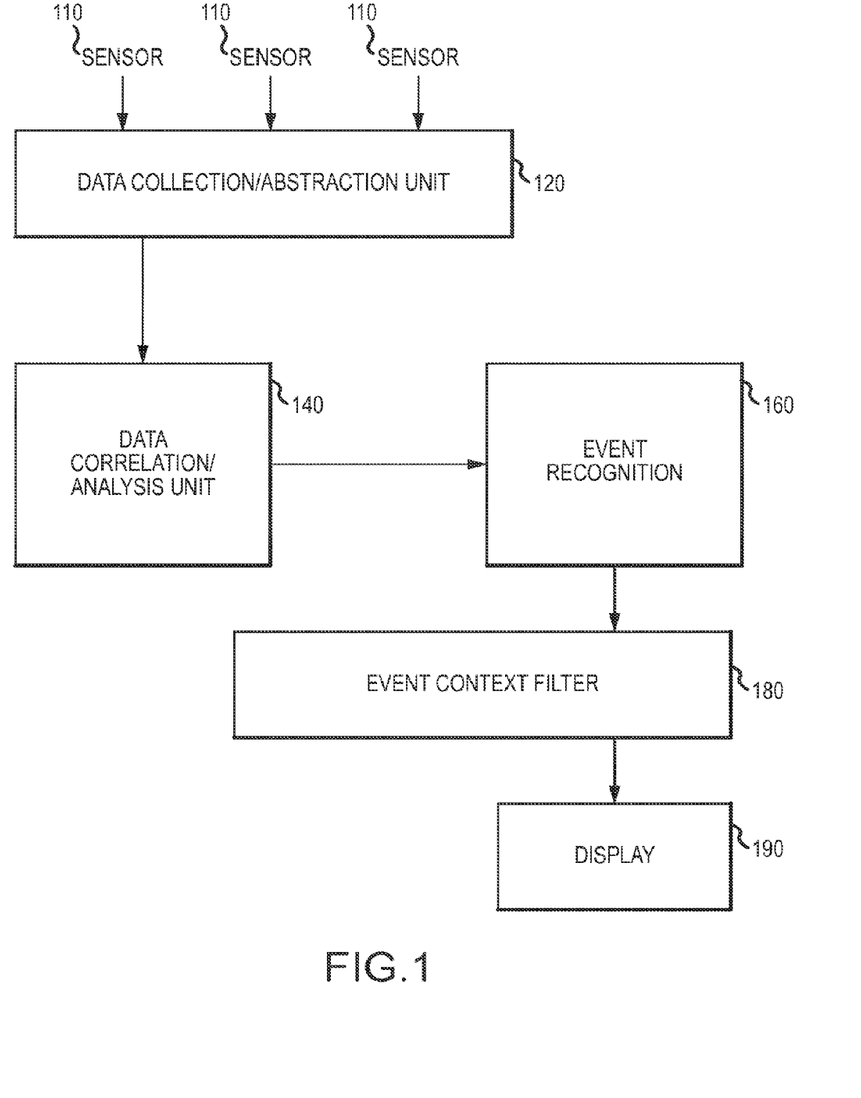
FIG. 1 shows a high level block diagram of a system for graphical rendition of multi-modal data according to one embodiment of the present invention.

FIG. 1 shows a high level block diagram of a system for graphical rendition of multi-modal data according to one embodiment of the present invention. Data from a plurality of sensors 110 is assimilated by a data collection/abstraction unit 120. According to one embodiment of the present invention the multi-modal data collected by the sensors includes a position and/or time reference. Once collected the data is abstracted for further processing and passed to data correlation/analysis unit 140. The passing or transference of data is, according to one embodiment of the present invention, accomplished via Ultra Wide Band ("UWB") transceivers. UWB communications transmit in a manner that does not interfere with conventional narrow band and carrier wave used in the same frequency band. UWB communications spread information over a large band (>500 MHz) enabling the spectrum to be shared. UWB transmissions transmit information by generating radio energy at specific time intervals occupying a large bandwidth to enable pulse-position or time modulation. As a result data can be conveyed in the interior of building or even underground. For example UWB transmissions can provide real-time position-based analysis in a distributed fashion using parallelism inherent to a decentralized approach. In other words, in a centralized positioning scheme the parallelism cannot be in real time whereas in the implementation of the present invention, parallel computation and analysis occurs simultaneously in each node because the UWB allows each node to position itself in reference to its nearest neighbors. At the data correlation/analysis unit 140 change and anomaly detection methodology is applied such as motion tracking and document the change analysis, radio frequency analysis and transmitter localization, acoustical change analysis, visual and thermal change analysis, topology, or other geocentric analysis and informational input from observers. For example fluctuations in the data stream for each modality can be examined to determine if there is an unexpected change or anomaly or change in spatial or temporal association. One aspect of the present invention is to identify physical (spatial) and temporal relationships among the different modalities and between the identified anomalies. In one version of the invention each anomaly from one or more modalities is associated with a position and a time stamp. Other anomalies identified from other modalities yet occurring within a certain tolerance band of time and position are grouped. By looking at the time and position stamp of each data point it is possible to connect data that is close in terms of time and/or space. Thus a plurality of anomalies independently identified from different modalities can be fused into a single representations that can be cross-correlated with other modalities.

According to one embodiment of the present invention, the particular methods for identifying meaningful fluctuations can be optimized for each particular modality. One approach to identify data anomalies can be described as follows: consider a energy sensor that collects information regarding the energy state of an object. The data correlation and analysis unit 140 of the present invention compares the recent energy (an average of the latest "n" sequential readings) (e.g., visual or thermal pixel matrix, range scan, etc.) to the average energy level for the earlier "m" time steps where m is more than "y" times greater than n. Whenever the difference between recent data (average of the last n readings) and the historical norm (the average of the past m readings) is significant (exceeds a specified threshold "z") an anomaly is recorded. Other methods may be used as needed to detect "significant" anomalies and changes for each modality (e.g velocity, volume, etc.) Note that in this example each of m, n, y and z are all adjustable. These values can be adjusted by a developer or online learning and can be used to alter sensitivity in order to keep the number of anomalies within accepted or predetermined/specified parameters. For example, when the number of anomalies detected within a certain time span is too great, increasing m, n, y or z will decrease the number of anomalies detected. Decreasing m, n, y or z will increase the number of anomalies detected.

Once anomalies or changes have been detected those changes attributed to noise or outliers are filtered out and the remaining data is analyzed for a correlation factor. In one embodiment of the present invention the data correlation and analysis unit 140 correlates anomalies from multi-modal data streams of data into a single frame of reference. This single frame of reference shares a common coordinate system based on an established sensory platform and shares a common coordinate system that can be used as a number of different backdrops including satellite imagery, terrain data, aerial vehicle imagery, or pre-existing geographical maps. The positional correlation of the data anomalies can be, in one embodiment the present invention based on a global positioning system (GPS). Moreover some features of the local environment can also be used to correlate multi-modal data anomalies in situations in which GPS or other more robust positional awareness systems are unavailable. Beyond positional awareness, the present invention establishes a contextual spatial and temporal relationship with each anomaly between various modalities. Thus different anomalies presented from different modalities but with similar spatial and temporal relationships can be merged to a single anomaly while two similar anomalies separated by either position or time will be considered separate events. For example a single event, detected by three different sensors, can be correlated to provide a user with useful coherent information. The present invention examines the temporal and spatial associations of each anomaly to determine whether they are associated with the same event. Rather than a user getting three separate data inputs related to the same event, the invention can merge the data into a single coherent rendition of the event based on contextual data collected from a plurality of modalities.

This aspect of the present invention utilizes, in one embodiment, stigmergic principles to build an increasingly robust frame of reference. Stigmergy is a method of indirect coordination between agents and events. The trace created in the real environment by an action or event stimulates the performance of the next action by the same or a different agent. Examples are the anthills and other structures built by insects. The present invention uses spatially salient features to correlate multi-modal changes and anomalies. These changes and anomalies are reinforced over iterative time steps by subsequent actions and inputs that build on (or cancel) one another, leading to the spontaneous emergence of a coherent map of systematic activity or events.

In one embodiment of the present invention correlated data is examined using a machine vision image processing 150 technique. The result of this analysis is then processed further as an input to an event recognition module 160. It should also be noted that the collection and examination of data is continuous and iterative. As data is collected, abstracted and anomalies are identified, the system correlates that data into events that are recognizable and useful to users. Another aspect of the recognition module is its ability to provide a spatial and temporal context within each anomaly. Both temporal and spatial aspects of an event can be used to provide useful insight as to the importance of the event and its correlation to other events and its surrounding. For example a high-speed target (multiple positional changes over a short period of time) may be insignificant on a highway while the same target (anomaly) may be important if the vector is directed at a facility perimeter. In the same manner the collection and analysis of the data is adjusted based on weightings and other input from the user as to the importance of a particular type of data or analysis. In such a way the system is adaptive enabling the user to influence the system and provide domain understanding and human bias.

The event recognition modules identifies physical (spatial) and temporal relationships between the anomalies and changes in contextual associations. In one embodiment this is done by position stamping each anomaly and then grouping each anomaly within a specified tolerance (a position and time threshold). By looking at the position and time stamp of each data point, it is possible to connect this event with data that is close in terms of time or space. The time threshold is known as "t" and the distance threshold as "d".

As one of reasonable skill in the relevant art will appreciate other techniques and means to recognize events from correlated data are equally applicable and contemplated by the present invention.

A classical deficiency of the prior art, and one addressed by the present invention, is that in computer vision or image processing (machine vision) there is a deficiency in determining whether or not an image contains an object, feature or event. Most object recognition processes compare selected object features to a database of traditional objects. If the features match, the system identifies that the object of the inquiry matches one in the database. But there is no substantive recognition of the context that the object is in the object in the database may convey an entirely different meaning than what was being represented by the featured object. Traditional display systems do not provide a means to transmute vital information about real world changes into a single graphical representation. The present invention identifies events rather than objects. Accordingly the data collected is used to form an object that conveys the contextual meaning of an event that can thereafter be used as a starting point for object recognition.

For example to convey the correct 'event' certain image structures can be enhanced or diminished so as to be appropriate for image recognition software, thereby conveying an event rather than just a static image. The features of the image are analyzed and critical components of the events they represent are identified based on their contextual association. Segmentation is then used to zero in on specific areas of interest. These processed images are then compared to images of events that have been previously inputted and identified. Image registration correlates the newly extracted area of interest to the same coordinate system of the identified events and a decision logic tree determines whether the new area of interest, including the event images, substantially matches a database entry of previously identified events.

From the correlation of multi-model data described above a coherent picture can be crafted that can be further analyzed to identify events and patterns that can be then filtered using a case-based reasoning tool or context filter 180.

The result are clusters of events that present suggested meanings or significance behind the correlated data. From these suggested meanings or significance behind the correlated data a suggested response or a course of action can be offered. Representations of the clusters of changes and anomalies can be presented visually in formats that are more easily understood by the user than the data streams from the various sources by themselves. For example, graphical connector entities, referred to here as graphical "tendrils," can be used to connect and/or group these anomalies visually on the screen when they meet the "t" and "d" time and space thresholds as stated above contextual analysis. Close groupings of changes within the same modality can be represented as colored blobs and, in this scheme, each colored blob has a size and shape that encompasses the various elemental changes.

In this embodiment tendrils connect contextual changes across modalities and are colored so that the tendril has a color gradient that fades from one color modality to the other. The color of the blob or cluster of events indicates the modality (e.g., visual, thermal, RF, etc.) while intensity can be used to indicate the extent of the change (e.g., the difference between the recent energy and historical average). Texture can also be used to indicate the kind of anomaly or change (a change in position vs. a change in size vs. a change in energy level). As one of reasonable skill in the relevant art will recognize the visual scheme presented above is one of many different means by which to abstract salient data into a graphical. Other schemes of graphical rendition of the data to be tailored according to the application and or user specifications.

According to another embodiment of the present invention visual pattern recognition technology can be employed to examine the cluster of events and/or the rendition of the correlated data to determine if the rendition provides identifiable patterns. Using such technology the resulting rendition is used as an input to determine if recognizable patterns may lead to emerging events to which a human or user should address.

In yet another embodiment of the present invention case based reasoning can be employed to identify which contextual relationships are significant to a user. According to one approach, case based reasoning is heuristic-based (based on a list of pragmatic, context based rules) and tied to both the mission and the modalities currently employed. Such an application allows the mission context to filter the events that are detected to lower the number of false declarations/alarms. Based on this mid-level analysis, parameters "t" and "d" for temporally and spatially correlating anomalies/changes, respectively, can be automatically and/or manually tuned to increase or decrease anomalies. This step filters events to only those are significant to the current task. For instance, a vehicle moving at high speeds may not be significant on a highway, but may be very important when protecting a facility perimeter.

Lastly, the collected, collated, analyzed data is rendered on display 190 so as to communicate situational awareness and recommended user actions. The identified events are communicated to a user in a spatially and temporally context. According to one embodiment of the present invention a rendition is provided that enables the user with the ability to visually "fly-through" layers of tactical information both spatially and temporally from a plurality of perspectives.

The present invention iteratively abstracts, correlates, analyzes, contextually associates and renders data so as to present meaningful event data information. Awareness from the collected data comes not from the quantity of data processed but from the particularly unique capacity of the systems to reject or filter contextual data; whittling a vast amount of data down into relatively few choice nuggets which can then be correlated in terms of time and space. Each step provides an additional level of abstraction and an additional reduction in the bandwidth of data while preserving and enhancing its relevancy.

These aspect of the present invention is similar to that which occurs in human perception. When an individual looks at a seemingly uniform white wall, the vast amount of the data (the white wall) is rejected, with the individual fixating only on anomalies and changes in the wall. Not all data or information is of the same significance. The importance often depends on the relative trajectory of the changing information and the user interaction with the data. The invention presented herein uses heuristics (tailored to the modality) to reject the vast majority of data to arrive at key percepts that are transformed into significant events. At each level of abstraction these percepts can be filtered and ordered in terms of priority (based on spatial and temporal context and overall mission application) until a specified threshold has been achieved in terms of the quantity of data/clusters/events. Once this threshold is reached, the process moves forward to the next level of abstraction.

The processes of the present invention further allow dynamic modulation of sensitivity and specificity. Accordingly the user can alter the thresholds and reanalyze the data so as to actively reconfigure the system and provide thorough data analysis from a number of perceptual "perspectives". Thus the present invention can respond to variations in such things as human workload constraints, human attention constraints, computing resource constraints, communication bandwidth availability, and the like.

Another feature of the present invention is that each data modality is processed asynchronously and in parallel with the other modalities. This allows separate computational processes or even separate data collection units (DCU) to function independently. In this way, each process or DCU can be separately optimized based on the sensor refresh rate and processing power available. For instance, wide area motion imagery may update at a very different rate than an acoustical sensor which is processing audible data. Data from each unit can be collected and processed as it becomes available and used to dynamically modify the rendition. This also enables the data collection efforts to be spatially distant. For instance data collection and processing for motion imagery may occur on an unmanned aerial vehicle while acoustical data collection and processing may occur on nearby ground vehicles. In one embodiment of the present invention, UWB technology is used to convey data between various data collection units.

Figure 2:
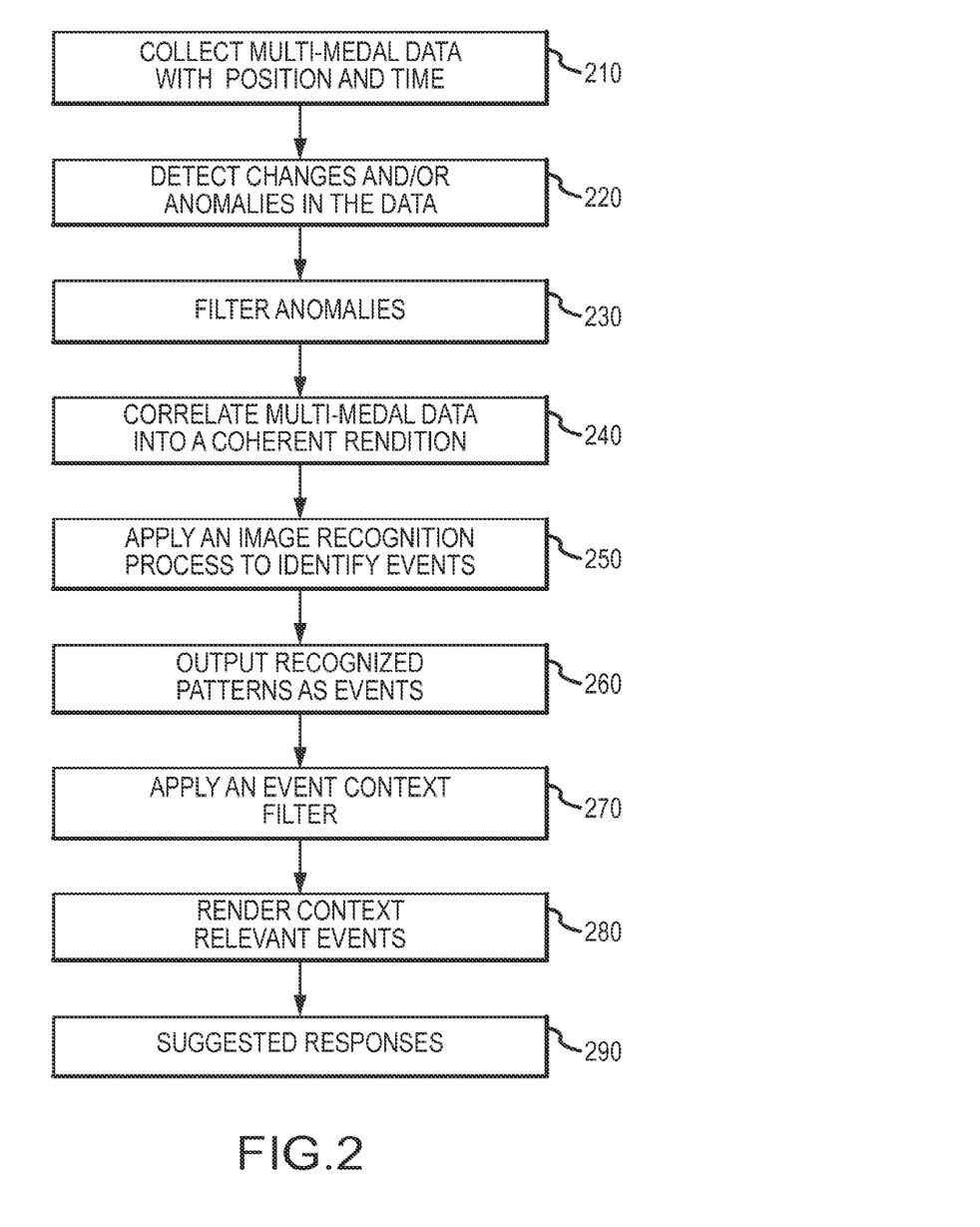
FIG. 2 shows one embodiment of a method of rendering multi-modal data according to the present invention.

FIG. 2 shows one embodiment of a method of rendering multi-modal data according to the present invention. As has been previously described the process to render multi-mobile data begins with the collection of such data including a positional and temporal timestamp 210. Once collected, changes and/or anomalies are detected 220 and thereafter filtered 230 to determine which anomalies and their changes are significant enough to be rendered for user interpretation.

To reduce noise and redundancy it is necessary to reduce the number of changes or anomalies into a more concise representation. According to one embodiment of the present invention the filtering process begins by recognizing spatial and temporal relationships or contextual associations between anomalies within each modality. These common modality anomalies are, in some cases, combined into a single anomaly. For example, when the distance "d" or time gap "t" between two anomalies/changes "a" and "$a^{prime}$" is less than a threshold value "g", discard both a and $a^{prime}$ and replace with a new entity a° that represents an average between the original anomalies. a° now has a position half way between the position of a and $a^{prime}$ and has a time stamp which occurs precisely half way between the time stamp of a and $a^{prime}$. Of course one of reasonable skill in the relevant art will recognize that there are multiple techniques and approaches to reduce the noise a redundancy of changes in her anomalies, all of which are contemplated by the present invention.

The filtering process continues by comparing the resulting number of remaining anomalies/changes "r" to a threshold value "1" used to cap the number of anomalies permitted within each modality. Note that this threshold value can be different for different modalities. This threshold "1", much like other parameters (m, n, y, and z), can be modified either in real time by the user or by a developer to adapt the system for different missions and resource constraints. In this example, if "r" is greater than "1", then the threshold value "g" is reduced step b above is recursively applied. Otherwise, the filtering process within the modality is complete.

In another approach case-based reasoning can be applied to filter changes/anomalies. In case-based reasoning some correlations are favored over others depending on the mission context (e.g. motion and sound may be more significant in a secure area where human presence is forbidden than in an open urban setting)

Returning attention to FIG. 2, the next step in the process for rendering multi—mobile data is to correlate the data into a coherent rendition 240. This step fuses the anomalies and changes from each separate modality into a common contextual representation and cross-correlates them between the various modalities.

To accomplish such a cross-correlation, according to one embodiment of the present invention, a specific coordinate space and contextual association is chosen. Thereafter all anomalies within the background image/map are uniquely represented such as using a different color to represent each modality. Opaqueness can be used to fade out anomalies over time (unless they are being reinforced by new data) and texture can be used to indicate differences between motion, changes and anomalous data. Intensity can be used to indicate the extent of the anomaly in terms of its difference from a historical basis or the extent of a change in relation to the background.

Once rendered the distance between anomaly a(i) and a(i+1) and t(i) as the time difference between the same anomalies are determined. Similarly for each anomaly a(i) within a specified area, d(i) is calculated whenever d(i) and t(i) are both within the specified threshold d' and t'. From this data a graphical tendril can be created between a(i) and a(i+1) such that the color gradient changes from the color of the anomaly a(i) to the color of a(i+1).

For a process such as demonstrated above, data anomalies and changes are coherently and contextually represented. From this data image recognition processing techniques 250 can be applied to identify events from the data and to recognize characteristic patterns 260.

Another filtering process can be applied to remove ancillary and outlier events from the contextual environment 270 resulting in a rendition 280 of relevant events based on multi-modal data. This rendition can then be supplemented with suggested course of action or responses 290.

The present invention, as demonstrated by one or embodiments presented herein, collects multi-modal data from a plurality of data sources, abstracts, contextually associates, filters and aggregates the data so as to arrive at useful insights. By performing these operations on the data information relating to an environment is represented by multiple pieces of seemingly unrelated data that can be presented to a user in a contextual format over relatively low bandwidth communications channels such as UWB technology such that the user can quickly assimilate the data and the environment to make intelligent decisions.

Based on biological models of low-level perceptual processing and attention the present invention creates a system that extracts anomalous signals and signatures from real-time sensor streams and clusters these together using case-based, spatial and temporal contextual, reasoning to identify critical events. These events can then be communicated at an abstract level to, for example, squad members so that very little raw data needs to be transmitted. The abstracted events are displayed to each user in a customizable egocentric map that shows the users' local environment.

The present invention detects and presents changes and anomalies in understandable and actionable formats utilizing, for example, color, intensity, icons and texture so as to create a spatial and temporal picture which becomes valuable to human users to help recognize current and developing situations and events. To give the user a context of his/her position with respect to the rest of the data the present invention, in one embodiment, uses a situation awareness backdrop (e.g., SLAM) or Global Positioning System data to create a representation indicating the user's local position, key environmental features, and motion boundaries. From multiple modalities of sensor data (acquired from UAVs, UGVs, UGSs and the like) and using UWB technology changes and anomalies are abstracted and filtered using case-based reasoning thereby providing a tractable data dimensionality. From this collection of data and events mission vision processing can be applied to recognize situations, dangerous or otherwise, as they emerge. These representations can assist a user in accessing an environment as well as form the basis for a recommended course of action.

Figure 3:
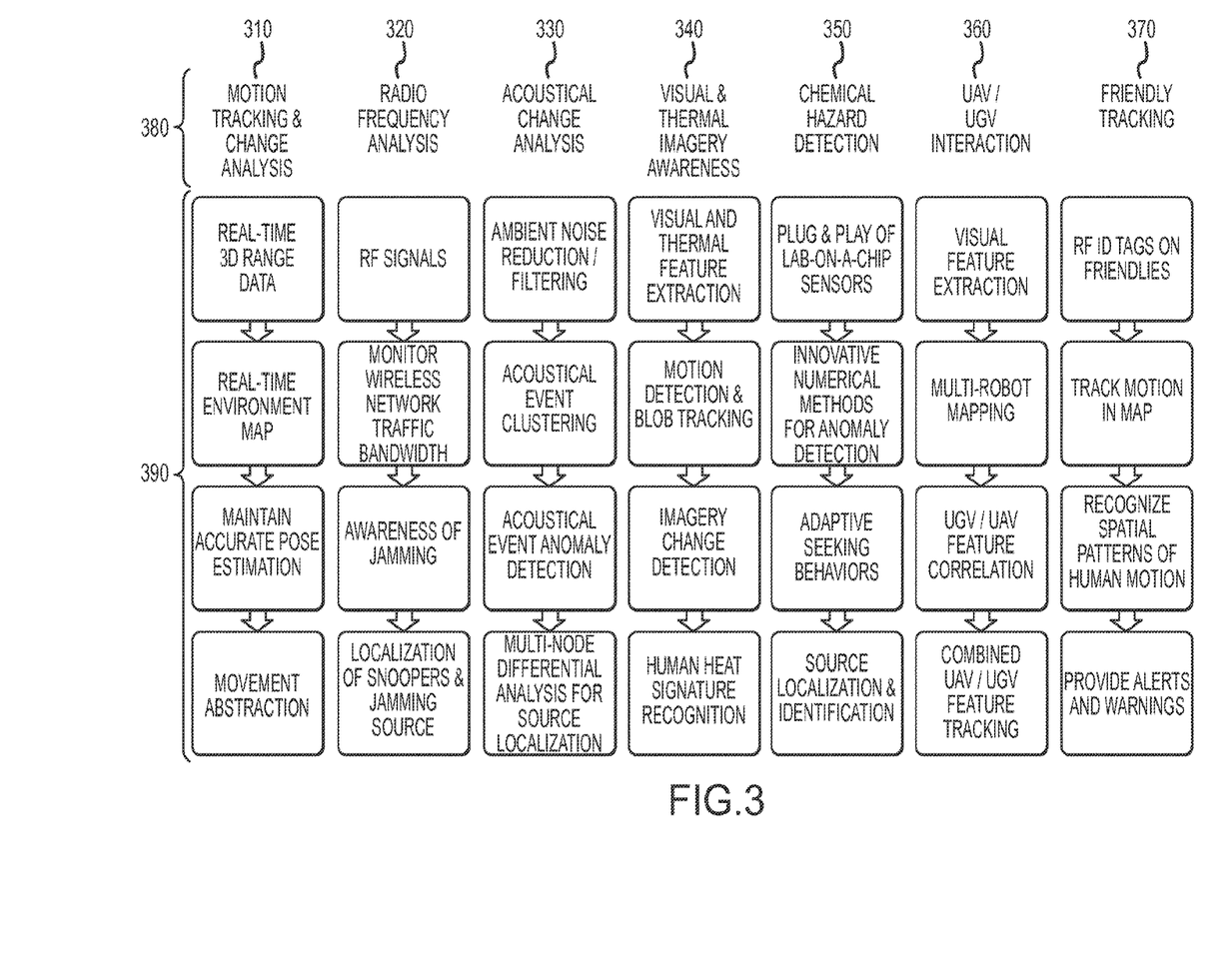
FIG. 3 is a high level block diagram of sensory data collection and processing so as to arrive at a graphical rendition of multi-modal data according to one embodiment of the present invention.

FIG. 3 show a high level block diagram of the collection, abstraction, contextual association, and rendition of multi-modal data according to one embodiment of the present invention. In the present depiction seven categories of multi-modal data are being rendered for user interaction and assessment. These categories 380 include motion tracking and change analysis 310, radio frequency analysis 320, acoustical change analysis 330, visual and thermal imagery awareness 340, chemical hazard detection 350, unmanned aerial vehicle and unmanned ground vehicle interaction 360, and friendly tracking 370. According to one embodiment of the present invention a rendition is made for user interaction depicting events and other useful information with respect to the contextual association of these seven categories. Presumably the mission being addressed by the robot or other device using the rendition formed by the present invention is desirous of having such information presented so that a user may interact with the spatial and temporal environment and make informed real-time decisions and adjustments.

Each column in FIG. 3 represents a particular type of category of multi-modal data. For example radio frequency analysis 320 is a combined analysis and rendering of a plurality of components 390 including, in this example, radio frequency signals, wireless network traffic bandwidth, jamming signals, and the localization of snooping signals and jamming sources. These various sources of multi-modal data 390 are combined sequentially to arrive at a rendition of radio frequency analysis 320 that is much more useful to the user that four separate displays of disparate data.

Similarly, a rendering of acoustical changes 330 in the local environment can be gained by abstracting and analyzing acoustical anomalies in multimodal data 390. Just as with radio frequency analysis, acoustical change analysis 330 can be accomplished by first collecting ambient noise information and reducing or filtering it so that an acoustical event can be identified and clustered. Thereafter anomalies within each acoustical event can be detected resulting in multi-nodal differential analysis for source localization.

In each of the seven categories listed in FIG. 3 a plurality of sensory data and analysis processes can be undertaken to arrive at an output that is then spatially and temporally clustered or cross-correlated to produce a rendition of multi-modal data that is not only useful to user but also provides an efficient conveyance of events within the environment in which a devices operates.

As will be understood by one of reasonable skill in the relevant art, the invention disclosed herein may be embodied in other specific forms without departing from the spirit or essential characteristics thereof. Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention.

While there have been described above the principles of the present invention in conjunction with a means by which to render multi-modal data, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

The invention claimed is:

1. A system for rendition of multi-modal data, comprising:
a plurality of sources of multi-modal data configured to collect data from an environment wherein each of the plurality of sources is associated with a distinct sensor modality having distinct data modalities;
a processor communicatively coupled to each of the plurality of sources of multi-modal data; and
a storage medium communicatively coupled to the processor and tangibly embodying a plurality of executable modules of instructions wherein each module of instructions is connected to the processor via a bus, the plurality of executable modules including
a data collection module, configured to asynchronously collect event data across the plurality of data modalities from each of the plurality of sources of multi-modal data and store the collected event data in memory,
an anomaly detection module, configured to independently detect from the collected event data one or more event anomalies for each of a plurality of data modalities against background/historical data and to associate each event anomaly with a data modality temporal identifier and a data modality spatial identifier, an event anomaly recognition module configured to identify a spatial and a temporal relationship between each of the one or more event anomalies among the plurality of data modalities, an anomaly correlation module configured to combine identified event anomalies to form a coherent common event representation that is cross-correlated based on a predetermined modality temporal window and a predetermined spatial window, and a rendition module configured to render cross-correlated common representations of detected event anomalies and the environment from a plurality of perspectives.

2. The system for rendition of multi-modal data according to claim 1, wherein collected event data from each data modality is processed asynchronously and in parallel with collected event data from other data modalities.

3. The system for rendition of multi-modal data according to claim 1, wherein the plurality of sources of multi-modal data includes a ultra-wide band transceiver.

4. The system for rendition of multi-modal data according to claim 1, wherein the collected event data collected from the plurality of sources includes a spatial and temporal reference.

5. The system for rendition of multi-modal data according to claim 1, wherein the anomaly correlation module combines two or more related event anomalies within a data modality.

6. The system for rendition of multi-modal data according to claim 1, wherein the anomaly detection module prioritizes event anomalies based on one or more predetermined criteria.

7. The system for rendition of multi-modal data according to claim 1, wherein the anomaly detection module filters detected anomalies based on background/historical data.

8. The system for rendition of multi-modal data according to claim 1, wherein the rendition module represents clusters of anomalies in visual formats.

9. A computer implemented method for rendering anomaly events based on multi-modal data, comprising executing on a processor the steps of:

collecting from a plurality of sources of multi-modal data within an environment static and/or dynamic multi-modal data wherein each of the plurality of sources is associated with a distinct sensor modality having distinct data modalities;

detecting independently from the collected static and/for dynamic multimodal data and based on background and historical data, one or more anomalies;

associating each of the one or more detected anomalies with a data modality temporal identifier and a data modality spatial identifier;

identifying from the one or more detected anomalies, one or more anomaly events based on a correlation between the data modality temporal identifiers and the data modality spatial identifiers;

combining identified anomaly events to form a coherent common event representation that is cross-correlated based on a predetermined modality temporal window and a predetermined spatial window; and rendering on a graphical display the coherent common event representation of identified anomaly events and the environment in which they occur from a plurality of perspectives.

10. The method for rendering anomaly events based on multi-modal data according to claim 9, further comprising abstracting collected static and/or dynamic data.

11. The method for rendering anomaly events based on multi-modal data according to claim 10, further comprising comparing abstracted collected data to pre-identified event temporal and spatial constraints.

12. The method for rendering anomaly events based on multi-modal data according to claim 9, wherein the plurality of sources of multi-modal data includes a ultra-wide band transceiver.

13. The method for rendering anomaly events based on multi-modal data according to claim 12, wherein change analysis includes motion tracking and occupancy change analysis.

14. The method for rendering anomaly events based on multi-modal data according to claim 12, wherein change analysis includes radio frequency analysis.

15. The method for rendering anomaly events based on multi-modal data according to claim 12, wherein change analysis includes acoustical change analysis.

16. The method for rendering anomaly events based on multi-modal data according to claim 12, wherein change analysis includes visual and thermal imagery analysis.

17. The method for rendering anomaly events based on multi-modal data according to claim 12, wherein change analysis includes chemical change analysis.

18. The method for rendering anomaly events based on multi-modal data according to claim 9, wherein detecting includes recognizing data fluctuations within each modality.

19. The method for rendering anomaly events based on multi-modal data according to claim 9, wherein identifying includes determining whether two or more detected anomalies occur within a pre-identified temporal period of time and within a pre-identified spatial proximity.

20. The method for rendering anomaly events based on multi-modal data according to claim 19, wherein the pre-identified spatial proximity is based on environmental features.

21. The method for rendering anomaly events based on multi-modal data according to claim 9, wherein identifying includes recognizing physical and temporal relationships between and among the detected one or more anomalies.

22. The method for rendering anomaly events based on multi-modal data according to claim 9, further comprising clustering the one or more anomalies based on common spatially salient features.

23. A non-transitory computer-readable storage medium comprising instructions stored thereon for rendering anomaly events based on multi-modal data that, when executed on a processor, perform the steps of:

collecting from a plurality of sources of multi-modal data within an environment static and/or dynamic multi-modal data wherein each of the plurality of sources is associated with a distinct sensor modality having distinct data modalities;

detecting independently from the collected static and/or dynamic multimodal data and based on background and historical data, one or more anomalies;

associating each of the one or more detected anomalies with a data modality temporal identifier and a data modality spatial identifier;

identifying from the one or more detected anomalies, one or more anomaly events based on a correlation between the data modality temporal identifiers and the data modality spatial identifiers;

combining identified anomaly events to form a coherent common event representation that is cross-correlated based on a predetermined modality temporal window and a predetermined spatial window; and rendering on a graphical display the coherent common event representation of identified anomaly events and the environment in which they occur from a plurality of perspectives.

24. The non-transitory computer-readable storage medium of claim 23, further comprising instructions for abstracting collected static and/or dynamic multimodal data.

25. The non-transitory computer-readable storage medium of claim 24, further comprising instructions for comparing abstracted collected data to pre-identified event characteristics.

26. The non-transitory computer-readable storage medium of claim 23, further comprising instructions for clustering the detected one or more anomalies based on common spatially salient features.

27. The non-transitory computer-readable storage medium of claim 23, wherein the instructions for identifying includes identifying physical and temporal relationships between and among the detected one or more anomalies.

* * * * *